(12) United States Patent
Yada et al.

(10) Patent No.: US 8,805,076 B2
(45) Date of Patent: Aug. 12, 2014

(54) IMAGE PROCESSING APPARATUS, IMAGE PROCESSING METHOD AND COMPUTER READABLE MEDIUM

(75) Inventors: Shinichi Yada, Kanagawa (JP); Kunikazu Ueno, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 913 days.

(21) Appl. No.: 12/505,747

(22) Filed: Jul. 20, 2009

(65) Prior Publication Data

US 2010/0189307 A1 Jul. 29, 2010

(30) Foreign Application Priority Data

Jan. 29, 2009 (JP) ................................. 2009-018577

(51) Int. Cl.
*G06K 9/34* (2006.01)

(52) U.S. Cl.
USPC ........................................................ 382/175

(58) Field of Classification Search
CPC ..................................................... G06K 9/346
USPC ......................................... 382/176, 175, 245
See application file for complete search history.

(56) References Cited

U.S. PATENT DOCUMENTS

| | | | | |
|---|---|---|---|---|
| 5,191,612 | A * | 3/1993 | Katsuyama et al. | 382/171 |
| 5,231,579 | A * | 7/1993 | Tsuchiya et al. | 715/235 |
| 5,867,159 | A * | 2/1999 | Hamada et al. | 345/443 |
| 5,960,726 | A | 10/1999 | Yamada | |
| 6,104,832 | A * | 8/2000 | Saito et al. | 382/176 |
| 6,141,444 | A * | 10/2000 | Hasegawa | 382/175 |
| 7,885,438 | B2 * | 2/2011 | Uppaluri et al. | 382/128 |
| 2001/0043740 | A1 * | 11/2001 | Ichikawa et al. | 382/176 |

FOREIGN PATENT DOCUMENTS

| | | |
|---|---|---|
| JP | A-4-291479 | 10/1992 |
| JP | A-5-12489 | 1/1993 |
| JP | A-7-13999 | 1/1995 |
| JP | A-7-230525 | 8/1995 |
| JP | A-8-95966 | 4/1996 |
| JP | A-10-134180 | 5/1998 |
| JP | A-10-171922 | 6/1998 |
| JP | A-11-76658 | 3/1999 |
| JP | A-11-123289 | 5/1999 |

OTHER PUBLICATIONS

Itoh et al., Aggregate size measurement by machine vision [on-line], Aug. 2008 [retrieved on Sep. 25, 2013], Journal of Terramechanics, vol. 45, Issue 4, pp. 137-145. Retrieved from the Internet: http://www.sciencedirect.com/science/article/pii/S002248980800058X#.*

(Continued)

*Primary Examiner* — Matthew Bella
*Assistant Examiner* — Dennis Rosario
(74) *Attorney, Agent, or Firm* — Oliff PLC

(57) ABSTRACT

An image processing apparatus includes a measuring unit that measures lengths of segments in an image; a first evaluating unit that evaluates each segment based on the length of the segment measured by the measuring unit and a position of the segment; a second evaluating unit that evaluates each segment based on a similarity of the length of the segment measured by the measuring unit and the position of the segment; and a determining unit that determines whether each segment is a ruled line based on an evaluation result obtained by the first evaluating unit and an evaluation result obtained by the second evaluating unit.

14 Claims, 21 Drawing Sheets

(56) References Cited

OTHER PUBLICATIONS

Borchani et al., Texture features for image classification and retrieval [on-line], Oct. 6, 1997 [retrieved on Sep. 25, 2013], Proc. SPIE 3229, Multimedia Storage and Archiving Systems II, vol. 3229, pp. 401-406. Retrieved from the Internet: http://proceedings.spiedigitallibrary.org/proceeding.aspx?articleid=932889.*

Notification of Reason for Refusal for corresponding Japanese Patent Application No. 2009-018577, mailed on Dec. 7, 2010 (w/ English translation).

* cited by examiner

FIG. 13A

| | a | b | c | d | e | f | g | h | i |
|---|---|---|---|---|---|---|---|---|---|
| A | 5800 | 3100 | 6300 | 8500 | 9100 | 6500 | 1700 | 2200 | 3800 |
| B | 1300 | 5800 | 7300 | 1300 | 8500 | 4700 | 8200 | 1100 | 6400 |
| C | 5400 | 8500 | 2200 | 6400 | 6300 | 3800 | 1700 | 2400 | 7300 |
| D | 9400 | 6400 | 4900 | 2200 | 5400 | 4700 | 2900 | 4500 | 6400 |
| E | 5200 | 4900 | 3100 | 4900 | 2400 | 5100 | 3900 | 4200 | 3800 |
| F | 3600 | 3700 | 5800 | 3100 | 5100 | 1800 | 2400 | 5400 | 6300 |
| G | 8500 | 7300 | 1300 | 7300 | 8100 | 8900 | 2200 | 5400 | 8500 |
| H | 2800 | 3700 | 8100 | 8500 | 6100 | 1700 | 6200 | 3800 | 4900 |

IMAGE PROCESSING APPARATUS, IMAGE PROCESSING METHOD AND COMPUTER READABLE MEDIUM

CROSS-REFERENCE TO RELATED APPLICATIONS

This application is based on and claims priority under 35 USC 119 from Japanese Patent Application No. 2009-018577 filed Jan. 29, 2009.

BACKGROUND

1. Technical Field

The present invention relates to an image processing apparatus, an image processing method and a computer readable medium.

2. Related Art

A technique has been proposed which reads a paper document using, for example, a scanner, analyzes a layout or a structure object, and reuses information written in the document or performs a process on the basis of the information. In particular, a ledger sheet, which is a kind of document, is generally used for business. Most of the ledger sheet is composed of tables. Therefore, a technique for analyzing the tables is required.

SUMMARY

According to an aspect of the invention, an image processing apparatus includes a measuring unit that measures lengths of segments in an image; a first evaluating unit that evaluates each segment based on the length of the segment measured by the measuring unit and a position of the segment; a second evaluating unit that evaluates each segment based on a similarity of the length of the segment measured by the measuring unit and the position of the segment; and a determining unit that determines whether each segment is a ruled line based on an evaluation result obtained by the first evaluating unit and an evaluation result obtained by the second evaluating unit.

BRIEF DESCRIPTION OF THE DRAWINGS

Exemplary embodiment(s) of the present invention will be described in detail based on the following figures, wherein:

FIG. 13A, FIG. 13B, FIG. 13C and FIG. 13D are diagrams for illustrating an example of the experimental results when experiments are conducted on a table composed of solid ruled lines.

DETAILED DESCRIPTION

Hereinafter, exemplary embodiments of the invention will be described with reference to the accompanying drawings.

Figure 1:
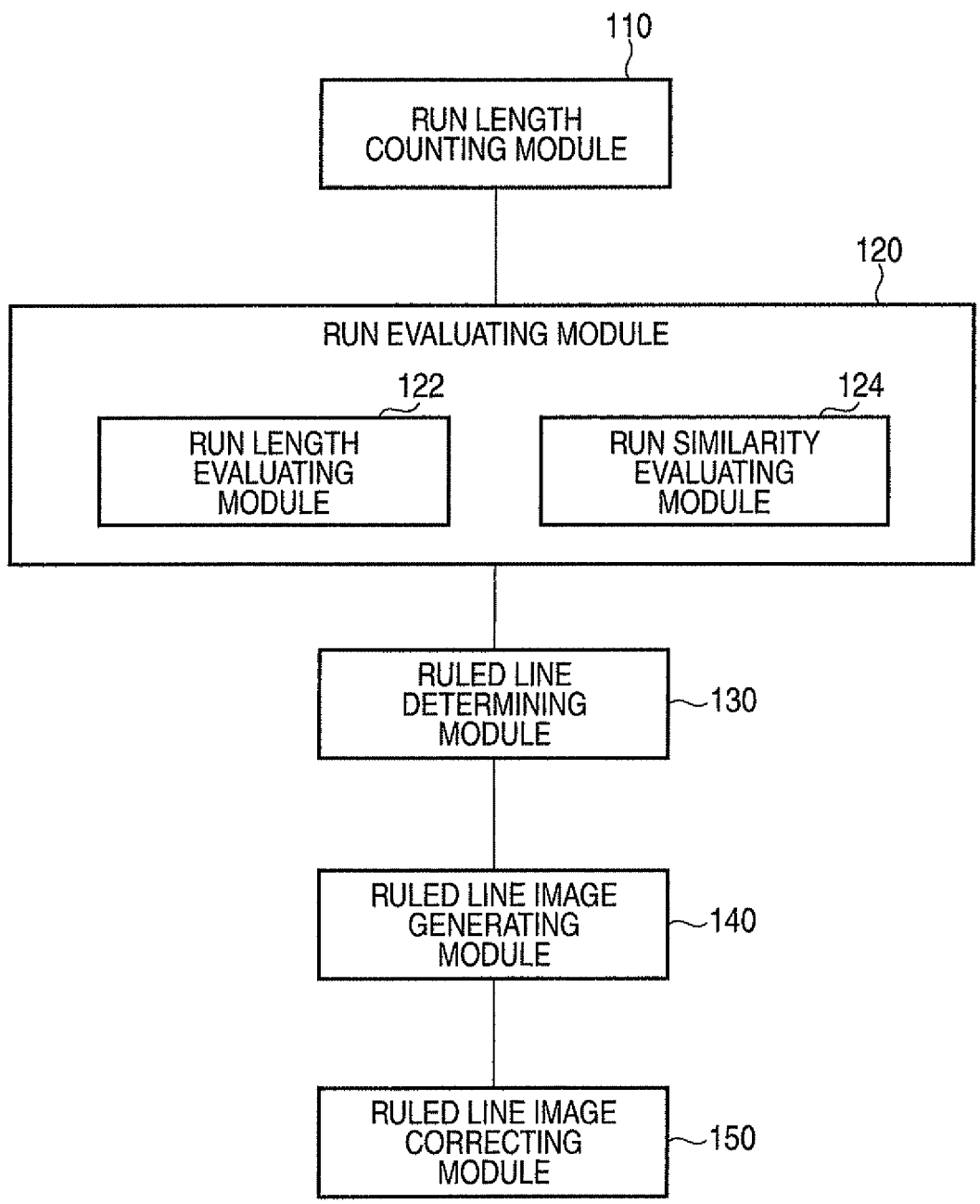
FIG. 1 is a conceptual module diagram illustrating an example of the structure of an exemplary embodiment of the invention.

FIG. 1 is a conceptual module diagram illustrating an example of the structure of an exemplary embodiment of the invention.

In general, a module indicates a part that can be logically separated, such as software (computer program) or hardware. Therefore, the module according to this embodiment indicates a module of a hardware configuration as well as a module of a computer program. Therefore, in this embodiment, a computer program, a system, and a method will be described. In this embodiment, "store", "cause something to store", and words equivalent thereto are used for convenience of description. When this embodiment is a computer program, these words mean that information is stored in a storage device, or a storage device is controlled so as to store information therein. Modules are substantially in one-to-one correspondence with their functions. However, actually, one module may be composed of one program, a plurality of modules may be composed of one program, or one module may be composed of a plurality of programs. A plurality of modules may be executed by one computer or one module may be executed by a plurality of computers in a distributed or parallel environment. One module may include another module. In addition, in the following description, the term "connection" includes logical connection (for example, transmission and reception of data, instructions, and the reference relation among data) as well as physical connection.

Further, a system or an apparatus may include a plurality of computers, hardware components, or devices connected to each other by a communication unit, such as a network (including communication connection in one-to-one correspondence), or it may include a single computer, a single hardware component, or a single device. The terms "device" and "system" are used as synonyms. The term "predetermined process" means a process before a target process, and the term "predetermined" means "determined in accordance with a condition/status before and after a process according to this embodiment starts" or "determined in accordance with a condition/status until that time".

An image processing apparatus according to this embodiment converts a table image composed of dotted and broken ruled lines into a table image composed of solid ruled lines. As shown in FIG. 1, the image processing apparatus includes a run length counting module 110, a run evaluating module 120, a ruled line determining module 130, a ruled line image generating module 140, and a ruled line image correcting module 150.

The run length counting module 110 is connected to the run evaluating module 120. The run length counting module 110 measures the run length in an image, and transmits the measured result to the run evaluating module 120. A binary image is used as a target, and for example, characters may be included in the table image.

The run means a segment. The run length means the number of pixels of a segment in the horizontal direction or the vertical direction (a scanning direction or a sub-scanning direction). The pixel of the run may be black or white. In the description of this embodiment, a black pixel is used as a target. Therefore, the run length is measured by scanning an image in the horizontal direction or the vertical direction to count the number of continuous black pixels. In this way, the length of a horizontal line or a vertical line is measured.

The run evaluating module 120 is connected to the run length counting module 110 and the ruled line determining module 130, and includes a run length evaluating module 122 and a run similarity evaluating module 124. The run evaluating module 120 controls the run length evaluating module 122 and the run similarity evaluating module 124 on the basis of the run length measured by the run length counting module 110 to generate data for determining whether a segment is a ruled line forming a table from the distribution of the run lengths. Then, the run evaluating module 120 transmits the generated data to the ruled line determining module 130.

The run length evaluating module 122 evaluates the segment on the basis of the run lengths measured by the run length counting module 110 and the position of the segment. For example, the run length evaluating module 122 may evaluate the segment on the basis of the accumulated number of pixels of the segment having a run length in a predetermined range at each position of the segment. Specifically, the number of black pixels (the sum of run lengths) of a vertical line having a segment length in a predetermined range at the position of a target image in the horizontal direction is counted. The predetermined range means, for example, a range less than a threshold value 1 or greater than a threshold value 2, and the threshold value 1 is less than the threshold value 2. This is because the number of black pixels of a short segment or a long segment is counted, but an intermediate segment therebetween is not a target. The number of pixels of a segment forming a dotted line or a solid line is counted, but the number of pixels of a line having an intermediate length therebetween is not counted. The line having an intermediate length corresponds to a segment forming, for example, a character or a broken line. For example, a broken line on the ruled line is extracted by the run similarity evaluating module 124. In addition, a dotted line on the ruled line may be extracted by both the run length evaluating module 122 and the run similarity evaluating module 124.

As such, the run length evaluating module 122 evaluates whether the segment is a short segment or a long segment of a ruled line. Then, the run length evaluating module 122 transmits the total number of black pixels of the segment at each position as the evaluation result to the ruled line determining module 130. In addition, the run length evaluating module 122 performs the same process as described above at the position of the target image in the vertical direction.

The run similarity evaluating module 124 evaluates the segment on the basis of the similarity of the run length measured by the run length counting module 110 (which includes "evenness", "identity", "homogeneity", and "uniformity" in this technical field) and the position of the segment. For example, the run similarity evaluating module 124 may evaluate the segment on the basis of the frequency of appearance of similar run lengths at each position of the segment. Specifically, the run similarity evaluating module 124 may evaluate the segment on the basis of the number of segments having run lengths in a predetermined range at the position of a target image in the horizontal direction or the vertical direction. In addition, the run similarity evaluating module 124 may calculate a similarity index indicating the frequency of appearance of segments having similar lengths at the position of a target image in the horizontal direction or the vertical direction.

For example, the similarity index is calculated by Formula 1 given below:

$$RLU(\theta) = \frac{\sum_a \left(\sum_R M(a, R; \theta)\right)^2}{\sum_a \sum_R M(a, R; \theta)}$$ [Formula 1]

where a indicates pixel density, R indicates a run length, $\theta$ indicates a scanning direction, and M(x) indicates the frequency of appearance.

RLU($\theta$) (RLU: run length uniformity) has a large value when there is a high frequency of the appearance of segments having similar run lengths. In addition, a indicates the pixel density. Since a binary image is used, a is 1 or 0. In this case, since the run length of a black pixel is the target, a is 1. R indicates the run length measured by the run length counting module 110 at a position in the horizontal direction. $\theta$ indicates the scanning direction. In this case, $\theta$ is 0 (the horizontal direction) or 90 (the vertical direction). M(x) indicates the frequency of appearance. Formula 1 is one of five indexes generally called a "run length matrix". The run length matrix is used to analyze a two-dimensional image. The run length matrix is mainly used for, for example, texture analysis and satellite photograph analysis.

As such, the run similarity evaluating module 124 evaluates whether the segment is a dotted line or a broken line of the ruled line. Then, the run similarity evaluating module 124 transmits the similarity index calculated at each position of the segment as the evaluation result to the ruled line determining module 130.

The ruled line determining module 130 is connected to the run evaluating module 120 and the ruled line image generating module 140. The ruled line determining module 130 determines whether the segment is a ruled line on the basis of the evaluation result obtained by the run length evaluating module 122 and the evaluation result obtained by the run similarity evaluating module 124. That is, as described above, the ruled line determining module 130 receives the total number of black pixels of the segment calculated at each position by the run length evaluating module 122 and the similarity index calculated at each position of the segment by the run similarity evaluating module 124, and determines whether the segment forms a ruled line (whether the segment is a vertical ruled line and whether the segment is a horizontal ruled line). Then, the ruled line determining module 130 transmits the determination result to the ruled line image generating module 140.

The ruled line image generating module 140 is connected to the ruled line determining module 130 and the ruled line image correcting module 150. The ruled line image generating module 140 uses the segment determined to be a ruled line by the ruled line determining module 130 to generate a table image. Then, the ruled line image generating module 140 transmits the table image to the ruled line image correcting module 150.

The segment determined to be the ruled line is either a horizontal line or a vertical line, and the type of segment includes, for example, a solid line, a dotted liner and a broken line. That is, for example, characters are removed from the original image, and an image including only the ruled lines is generated.

The ruled line image correcting module 150 is connected to the ruled line image generating module 140. The ruled line image correcting module 150 converts the ruled lines of the table image generated by the ruled line image generating module 140 into solid lines. That is, the ruled line image correcting module 150 converts, for example, a dotted line or a broken line into a solid line in order to facilitate the subsequent image analysis (for example, the analysis of a table structure). For example, expansion in the vertical or horizontal direction is performed and then contraction is performed. This process may be individually performed in the vertical and horizontal directions. That is, an image determined to be a vertical ruled line is expanded in the vertical direction and then contracted. Similarly, an image determined to be a horizontal ruled line is expanded in the horizontal direction, and then contracted. In this way, for example, a dotted or broken ruled line is converted into a solid line.

Figure 2:
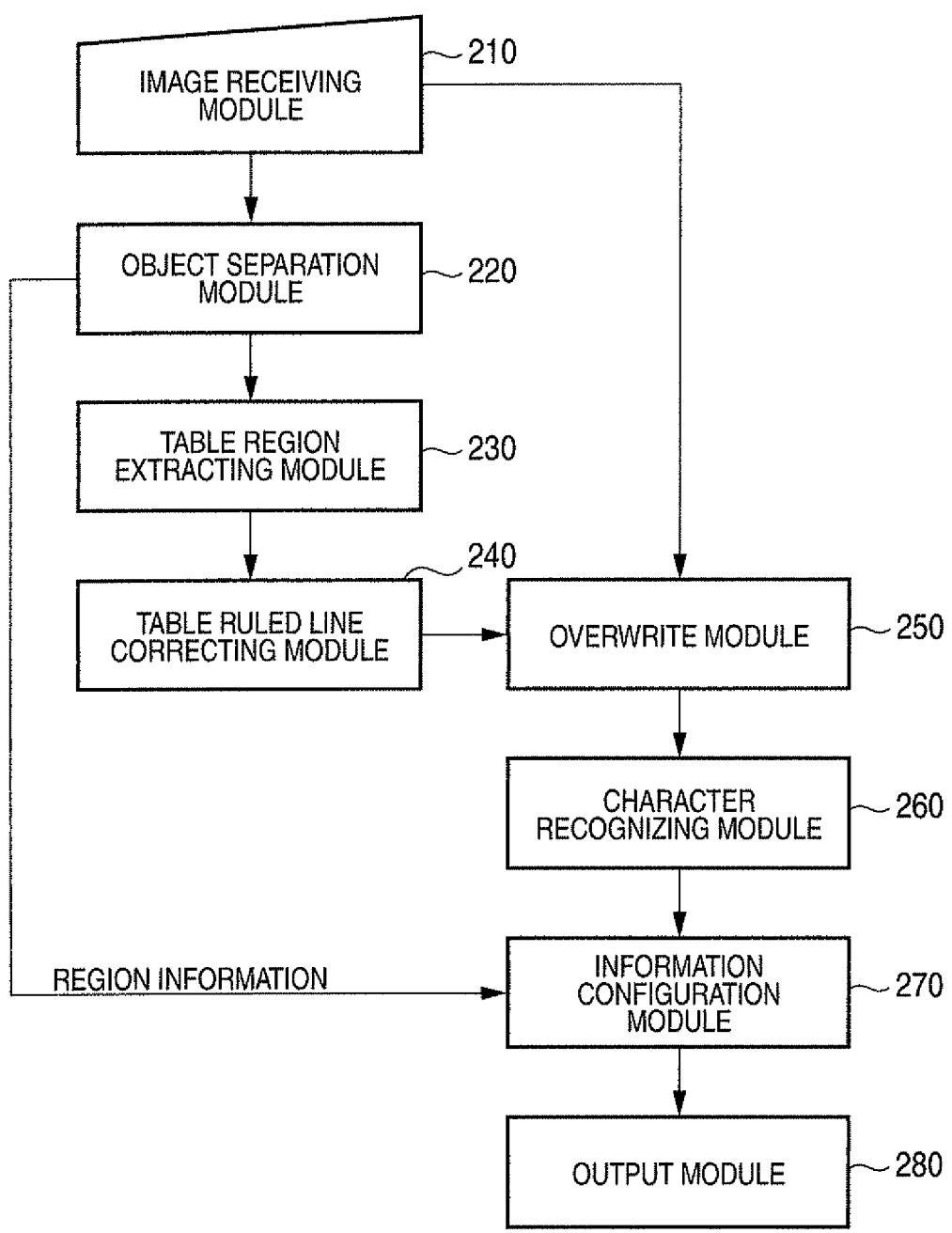
FIG. 2 is a conceptual module diagram illustrating an example of the overall structure of an image processing apparatus according to this embodiment.

FIG. 2 is a conceptual module diagram illustrating an example of the overall structure of the image processing apparatus according to this embodiment.

The image processing apparatus includes an image receiving module 210, an object separation module 220, a table region extracting module 230, a table ruled line correcting module 240, an overwrite module 250, a character recognizing module 260, an information configuration module 270, and an output module 280.

The image receiving module 210 is connected to the object separation module 220 and the overwrite module 250. The image receiving module 210 receives an image and transmits the image to the object separation module 220 and the overwrite module 250. The reception of an image includes the reading of an image from, for example, a scanner or a camera, the reception of an image from an external apparatus through a communication line, such as a facsimile, and the reading of an image stored in, for example, a hard disk (which includes a hard disk provided in a computer and a hard disk connected to the computer through a network). The image may be a binary image or a multi-valued image (color image). In the case of the multi-valued image, the multi-valued image is binarized, and then converted into a binary image. One image or a plurality of images may be received. The image may be a document, such as a business form, or an advertising pamphlet, as long as it includes a table. In addition, the image receiving module 210 may perform pre-processing, such as noise removal, inclination correction, or normalization, on the received image.

The object separation module 220 is connected to the image receiving module 210, the table region extracting module 230, and the information configuration module 270. The object separation module 220 separates the image received by the image receiving module 210 into objects (partial images). The objects include at least a table region. In addition, the objects include, for example, a character region, a figure region, and a photograph region. Then, the object separation module 220 transmits the separation result to the table region extracting module 230, and transmits region configuration information (for example, the position of each region in the received image) to the information configuration module 270.

The separation of the received image into the partial images is performed by extracting regions (partial images) partitioned by blanks from the image. The process of separating the partial images partitions the image received by the image receiving module 210 using white pixel regions having a length (or area) equal to or greater than a predetermined value. When the received image is partitioned in this way, it is possible to extract a black pixel region (for example, a rectangle). In addition, it is possible to extract the image features of the black pixel region (for example, an area, a size in the vertical or horizontal direction, a shape, and the position of the black pixel region), and determine the types of character regions, figure regions, table regions, and photograph regions. Other existing methods may be used to extract the partial images.

The table region extracting module 230 is connected to the object separation module 220 and the table ruled line correcting module 240. The table region extracting module 230 receives the separation result from the object separation module 220, and extracts the image of a table region from the image received by the image receiving module 210. Then, the table region extracting module 230 transmits the image of the table region to the table ruled line correcting module 240.

The table ruled line correcting module 240 is connected to the table region extracting module 230 and the overwrite module 250. The table region extracting module 230 is composed of the module shown in FIG. 1. That is, the table ruled line correcting module 240 receives the image of the table region from the table region extracting module 230, extracts ruled lines forming the table from segments in the image of the table region, converts the ruled lines into solid lines, and generates a table image composed of the solid lines. Then, the table ruled line correcting module 240 transmits the generated table image to the overwrite module 250. This will be described in detail below with reference to FIG. 3.

The overwrite module 250 is connected to the image receiving module 210, the table ruled line correcting module 240, and the character recognizing module 260. The overwrite module 250 overwrites the table image generated by the table ruled line correcting module 240 on the image received by the image receiving module 210. Then, the overwrite module 250 transmits the image having the table image overwritten thereon to the character recognizing module 260. The overwriting of the table image makes it possible to obtain an image formed by converting the dotted or broken lines of the table in the original image into solid lines. Therefore, in the subsequent process, a table composed of the solid lines is the target of the processing.

The character recognizing module 260 is connected to the overwrite module 250 and the information configuration module 270. The character recognizing module 260 performs a character recognizing process on the image having the table image overwritten thereon by the overwrite module 250. In this case, the character recognizing process may be the existing character recognizing process. As the character recognizing process, for example, a table structure analyzing process may be performed. For example, the existing character recognizing program may be used without any change. In this case, the table structure analyzing process may be performed on a table composed of solid ruled lines rather than a table composed of dotted ruled lines. Then, the character recognizing module 260 transmits the character recognition result to the information configuration module 270.

The information configuration module 270 is connected to the object separation module 220, the character recognizing module 260, and the output module 280. The information configuration module 270 receives the character recognition result from the character recognizing module 260 and the region configuration information from the object separation module 220, and generates configuration information as the analysis result of the image. For example, the configuration information includes information indicating the position of a character string in the image, the structure of the table, and the kind of character string in a cell of the table. Then, the information configuration module 270 transmits the configuration information to the output module 280.

The output module 280 is connected to the information configuration module 270. The output module 280 receives the configuration information from the information configuration module 270, converts the received configuration information into page information, and outputs the page information. The page information includes, for example, a format such as XML (extensible markup language). In addition, the output includes, for example, the storage of information in a document database, and the transmission of information to another information process apparatus such as a translation processing apparatus. In addition, the output may include the printing of an image by a printing apparatus, such as a printer, in order to instruct the clean copy of an image, the display of an image on, for example, a display device, and the transmission of an image from an image transmitting apparatus, such as a facsimile.

Figure 3:
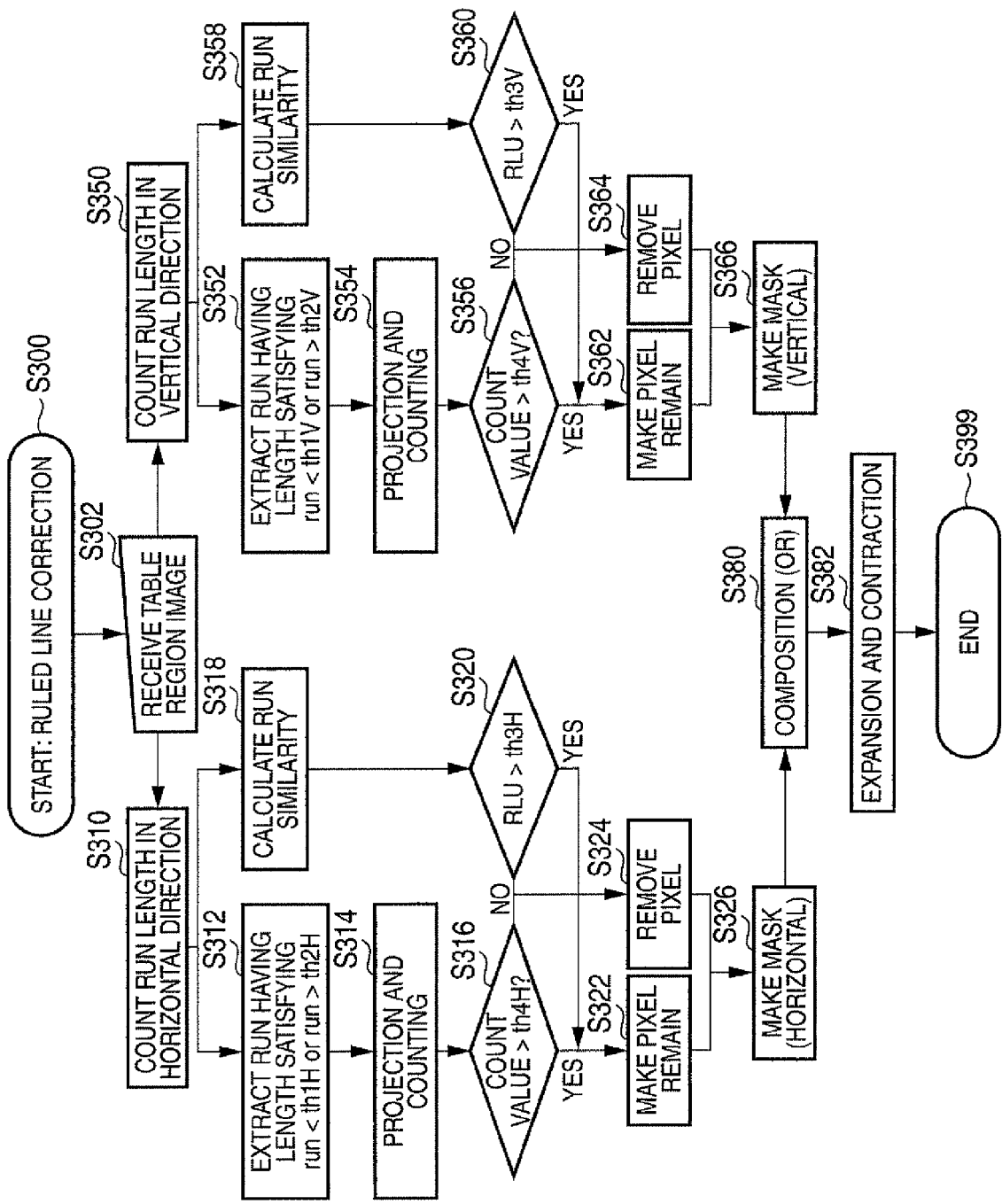
FIG. 3 is a flowchart illustrating an example of a process according to this embodiment.

FIG. 3 is a flowchart illustrating an example of a process according to this embodiment. This flowchart shows an example of the process performed by the table ruled line correcting module 240 shown in FIG. 2, and an example of the process performed by the module shown in FIG. 1.

In Step S302, the table ruled line correcting module 240 receives a table region image from the table region extracting module 230. A horizontal ruled line (a ruled line in the horizontal direction) process in Step S310 and a vertical ruled line (a ruled line in the vertical direction) process in Step S350 are performed on the same image.

Figure 4:
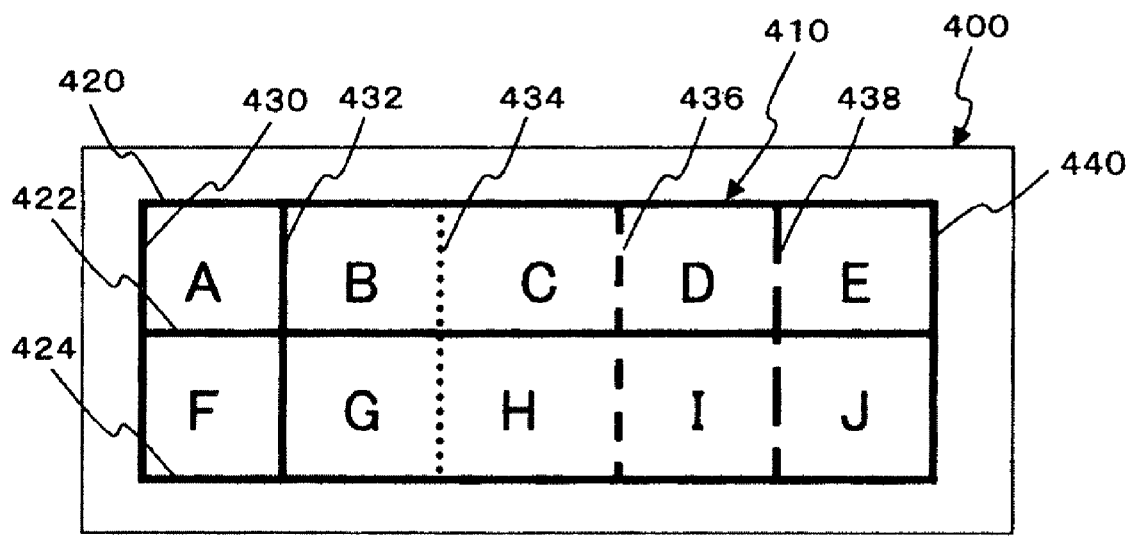
FIG. 4 is a diagram illustrating an example of a table region image according to this embodiment.
Figure 5:
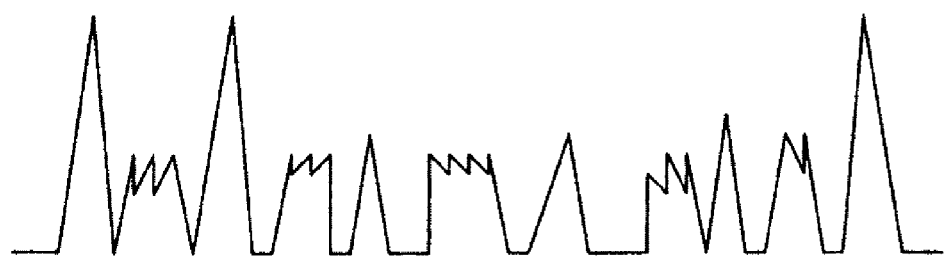
FIG. 5 is a diagram illustrating an example of a histogram for the number of black pixels.

For example, a table region image 400 shown in FIG. 4 is processed. The table region image 400 includes a table 410 composed of horizontal ruled lines 420 to 424 and vertical ruled lines 430 to 440. In addition, as shown in FIG. 4, a character is written in each cell of the table 410. When the number of black pixels in the vertical direction is counted at each position (horizontal direction) in the table region image 400, a histogram shown in FIG. 5 is obtained. It is difficult to separate ruled lines and the other portion (a portion having the characters therein) from the waveform using a threshold value. This is because the number of black pixels of a ruled line in a dotted line portion and a broken line portion is not discriminated from the number of black pixels in a character portion, as shown in FIG. 5.

In Step S310, the run length counting module 110 measures the run length of each run in the horizontal direction.

In Step S312, the run length evaluating module 122 extracts runs having run lengths that are smaller than a threshold value 1H or greater than a threshold value 2H (run<th1H or run>th2H) where th2H>th1H.

In Step S314, the run length evaluating module 122 counts the number of black pixels of the run extracted in Step S312 at each position. The term 'each position' means each position when a target run is projected in the horizontal direction. For example, a histogram on the vertical axis shown in FIG. 6A corresponds to each position. The histogram indicates the counted number of black pixels of runs having run lengths smaller than the threshold value 1H or greater than the threshold value 2H.

In Step S316, the ruled line determining module 130 determines whether the number of black pixels counted in Step S314 is greater than a threshold value 4H. If it is determined that the number of black pixels is greater than the threshold value 4H (Yes), the process proceeds to Step S322. If not (No), the process proceeds to Step S324. For example, in FIG. 6A, there are three portions (projection waveforms 621, 622, and 623) in which the number of black pixels is greater than the threshold value 4H, which correspond to horizontal ruled lines 420, 422, and 424, respectively.

In Step S318, the run similarity evaluating module 124 calculates the similarity of the runs in the horizontal direction. The calculation result corresponds to, for example, a graph shown in FIG. 7A. The graph is obtained by plotting the values calculated by Formula 1 at positions (on the vertical axis) in the horizontal direction.

In Step S320, the ruled line determining module 130 determines whether RLU in Step S318 is greater than a threshold value 3H. If it is determined that RLU is greater than the threshold value 3H (Yes), the process proceeds to Step S322. If not (No), the process proceeds to Step S324. For example, in FIG. 7A, there is no portion that is greater than the threshold value 3H.

Figure 6A:
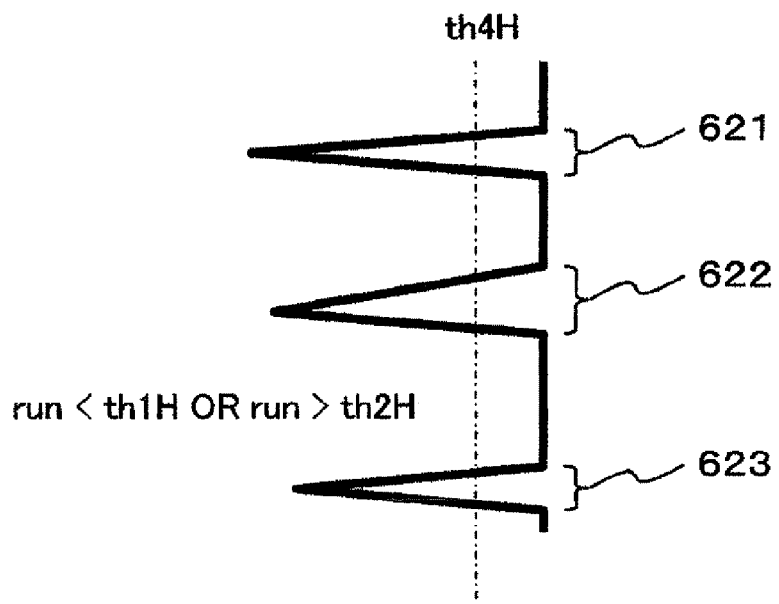
FIG. 6A and FIG. 6B are diagrams for illustrating an example of a histogram for the number of black pixels having run lengths in a predetermined range.
Figure 7A:
FIG. 7A and FIG. 7B are diagrams for illustrating an example of a graph made on the basis of a similarity evaluation result.

In Step S322, when the determination result in Step S316 or Step S320 is Yes, the ruled line image generating module 140 allows the pixels in the horizontal direction of a target table region image to remain. In FIG. 6A, projection waveforms 621, 622, and 623 remain. In FIG. 7A, there is no remaining portion. Therefore, when Step S322 ends, the projection waveforms 621, 622, and 623 remain in the table region image 400.

In Step S324, when the determination result in Step S316 or Step S320 is No, the ruled line image generating module 140 removes the pixels in the horizontal direction from the target table region image. In FIG. 6A, portions other than the projection waveforms 621, 622, and 623 are removed. In FIG. 7A, all portions are removed. Therefore, when Step S324 ends, portions other than the projection waveforms 621, 622, and 623 are removed from the table region image 400.

Figure 8A:
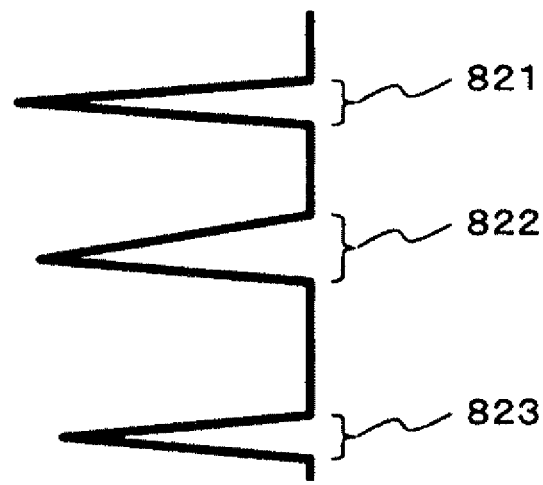
FIG. 8A and FIG. 8B are diagrams for illustrating an example of a composition of two process results.

In Step S326, the ruled line image generating module 140 generates a mask image having only the horizontal lines, which are ruled lines, remaining therein from the image remaining in Step S322 and the image removed in Step S324. In addition, as shown in FIG. 8A, the mask image may be generated from a composition of the example shown in FIG. 6A and the example shown in FIG. 7A.

In Step S350, the run length counting module 110 measures the run length of each run in the vertical direction.

In Step S352, the run length evaluating module 122 extracts runs having run lengths that are smaller than a threshold value 1V or greater than a threshold value 2V (run<th1V or run>th2V) where th2V>th1V.

In Step S354, the run length evaluating module 122 counts the number of black pixels of the run extracted in Step S352 at each position. The term 'each position' means each position when a target run is projected in the vertical direction. For example, a histogram on the horizontal axis shown in FIG. 6B corresponds to each position. The histogram indicates the counted number of black pixels of runs having run lengths smaller than the threshold value 1V or greater than the threshold value 2V.

In Step S356, the ruled line determining module 130 determines whether the number of black pixels counted in Step S354 is greater than a threshold value 4V. If it is determined that the number of black pixels is greater than the threshold value 4V (Yes), the process proceeds to Step S362. If not (No), the process proceeds to Step S364. For example, in FIG. 6B, there are four portions (projection waveforms 611, 612, 613, and 614) in which the number of black pixels is greater than the threshold value 4V, which correspond to vertical ruled lines 430, 432, 434, and 440, respectively.

In Step S358, the run similarity evaluating module 124 calculates the similarity of the runs in the vertical direction. The calculation result corresponds to, for example, a graph shown in FIG. 7B. The graph is obtained by plotting the values calculated by Formula 1 at positions (on the horizontal axis) in the vertical direction.

Figure 7B:
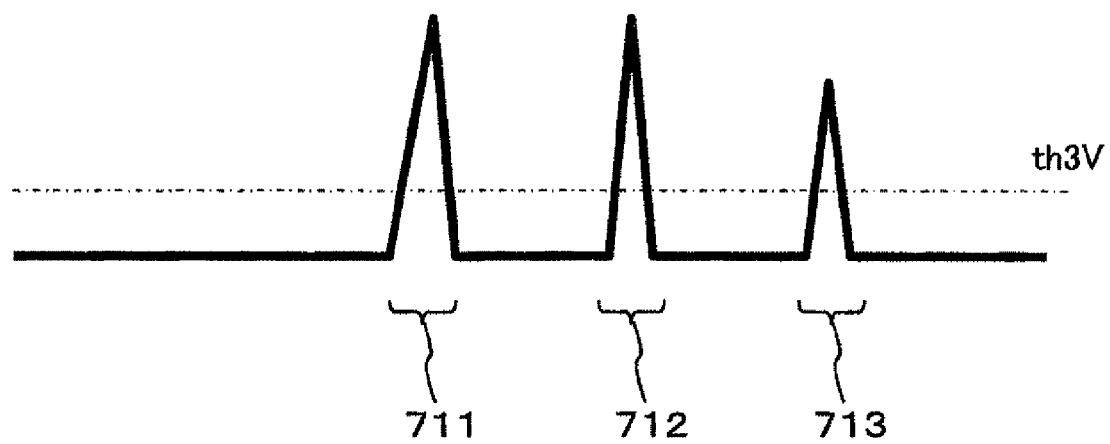

In Step S360, the ruled line determining module 130 determines whether RLU in Step S358 is greater than a threshold value 3V. If it is determined that RLU is greater than the threshold value 3V (Yes), the process proceeds to Step S362. If not (No), the process proceeds to Step S364. For example, as shown in FIG. 7B, there are three portions (projection waveforms 711, 712, and 713) that are greater than the threshold value 3V, which correspond to vertical ruled lines 434, 436, and 438, respectively.

Figure 6B:
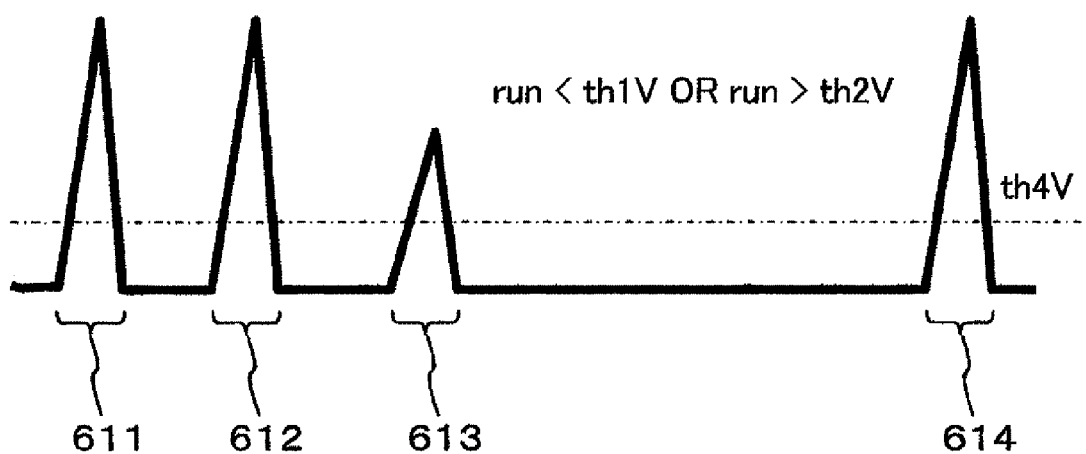

In Step S362, when the determination result in Step S356 or Step S360 is Yes, the ruled line image generating module 140 allows the pixels in the vertical direction of a target table region image to remain. In FIG. 6B, projection waveforms 611, 612, 613, and 614 remain. In FIG. 7B, projection waveforms 711, 712, and 713 remain. Therefore, when Step S362 ends, the projection waveforms 611, 612, 613 (711), 712, 713, and 614 remain in the table region image 400.

In Step S364, when the determination result in Step S356 or Step S360 is No, the ruled line image generating module 140 removes the pixels in the vertical direction from the target table region image. In FIG. 6B, portions other than the projection waveforms 611, 612, 613, and 614 are removed. In FIG. 7B, portions other than the projection waveforms 711, 712, and 713 are removed. Therefore, when Step S364 ends, portions other than the projection waveforms 611, 612, 613 (711), 712, 713, and 614 are removed from the table region image 400.

Figure 8B:
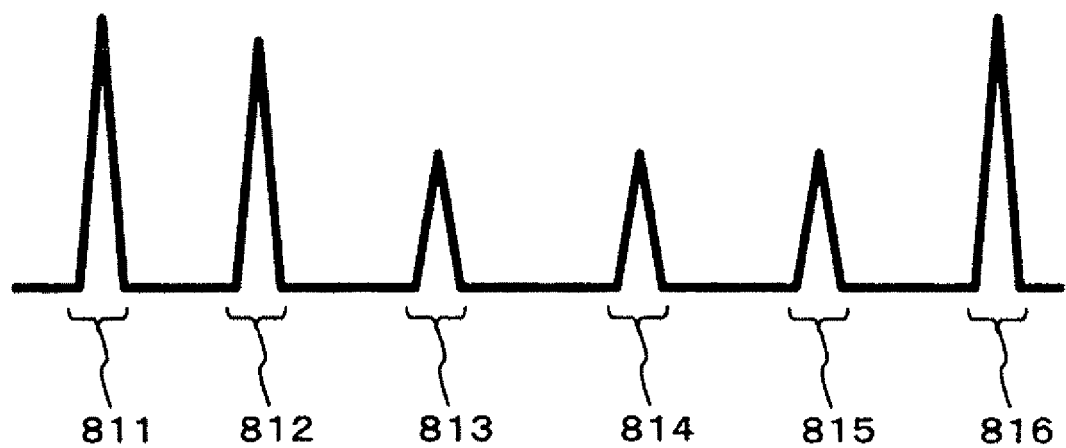

In Step S366, the ruled line image generating module 140 generates a mask image having only the vertical lines, which are ruled lines, remaining therein from the image remaining in Step S362 and the image removed in Step S364. In addition, as shown in FIG. 8B, the mask image may be generated from a composition of the example shown in FIG. 6B and the example shown in FIG. 7B.

In the process from Steps S310 to Step S326, the threshold value 1H, the threshold value 2H, the threshold value 3H, and the threshold value 4H are for the horizontal ruled lines. The threshold value 1V, the threshold value 2V, the threshold value 3V, and the threshold value 4V used in the process from Steps S350 to Step S366 are for the vertical ruled lines, and may have the same value as those for the horizontal ruled lines or different values therefrom.

In Step S380, the ruled line image generating module 140 composes the image composed of only the horizontal lines, which are ruled lines, generated in Step S326 with the image composed of the vertical lines, which are ruled lines, generated in Step S366. For example, the table 410 shown in FIG. 4 is changed into that shown in FIG. 9. That is, characters are removed from the table 410 shown in FIG. 4, and the table 410 composed of only ruled lines is extracted.

Figure 9:
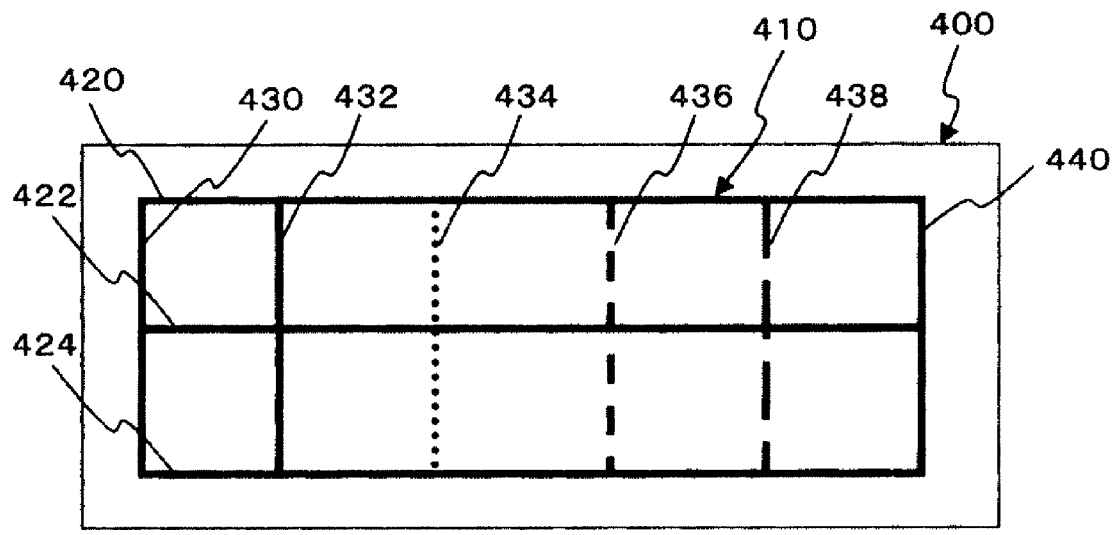
FIG. 9 is a diagram illustrating an example of extracting a ruled line from a table.
Figure 10:
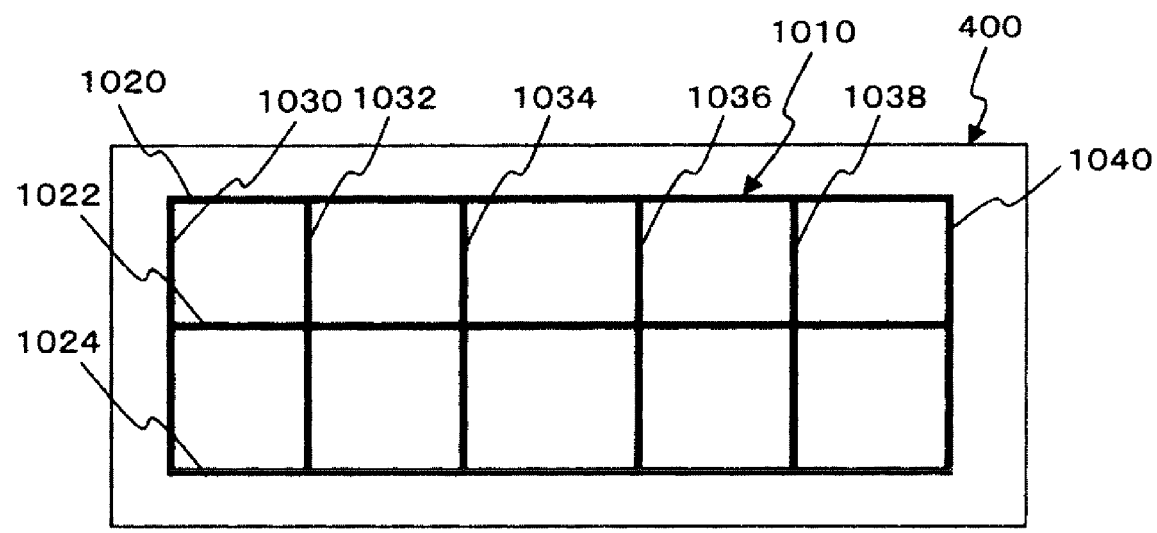
FIG. 10 is a diagram illustrating an example of converting a dotted or broken ruled line in a table into a solid ruled line.

In Step S382, the ruled line image correcting module 150 performs an expansion and contraction process to convert dotted lines and broken lines into solid lines. For example, the table 410 shown in FIG. 9 is changed into that shown in FIG. 10. That is, characters are removed from the table 410 shown in FIG. 4, and a table 1010 composed of solid ruled lines is generated.

Figure 11A:
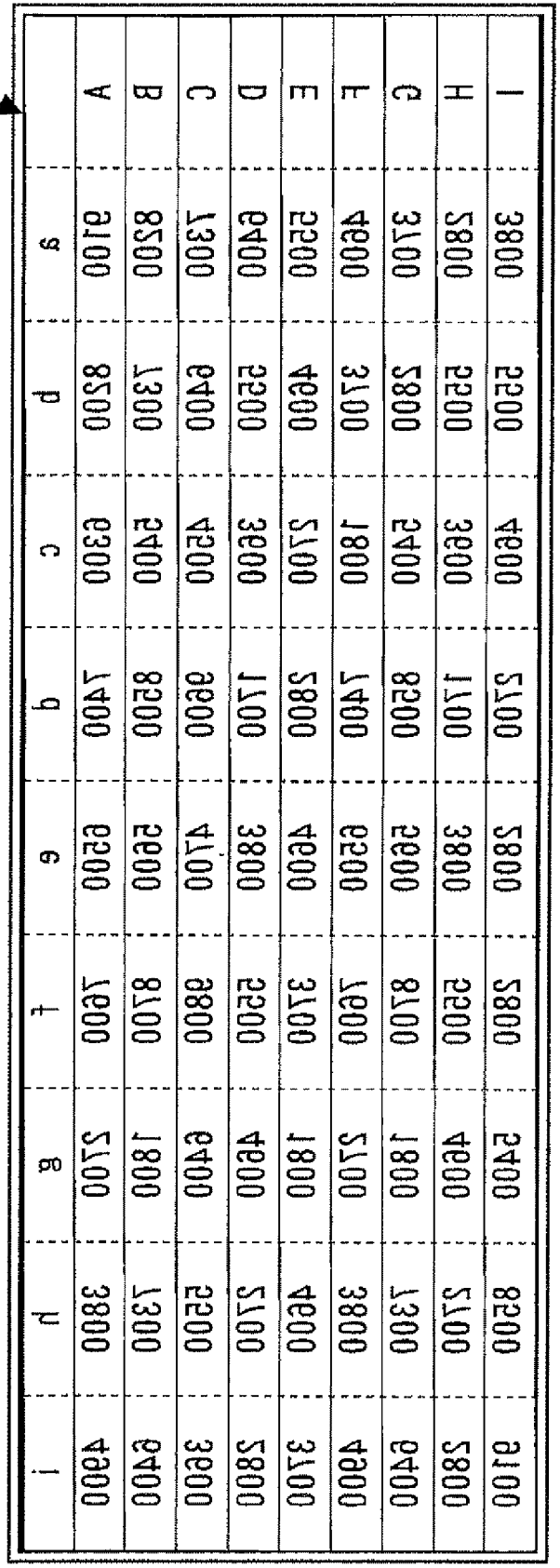
FIG. 11A, FIG. 11B, FIG. 11C and FIG. 11D are diagrams for illustrating an example of the experimental results when experiments are conducted on a table composed of ruled lines including broken lines.
Figure 11B:
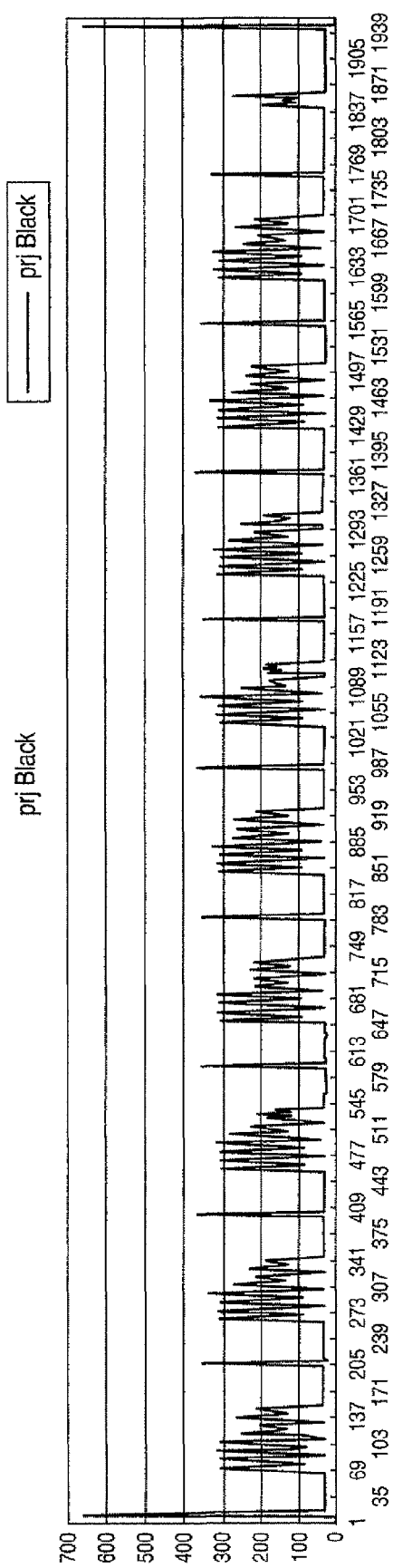
Figure 11C:
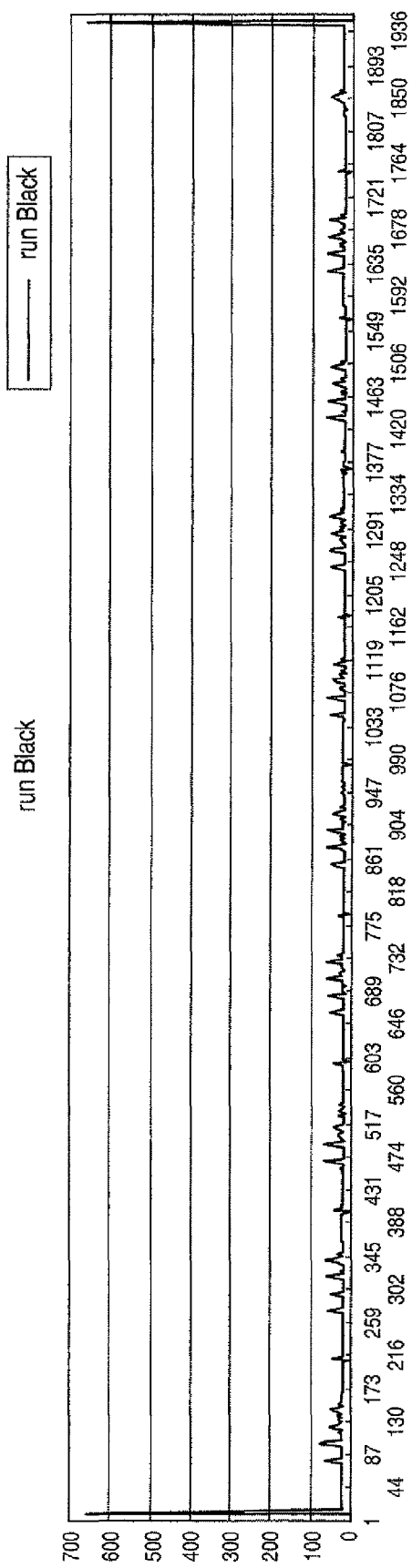
Figure 11D:
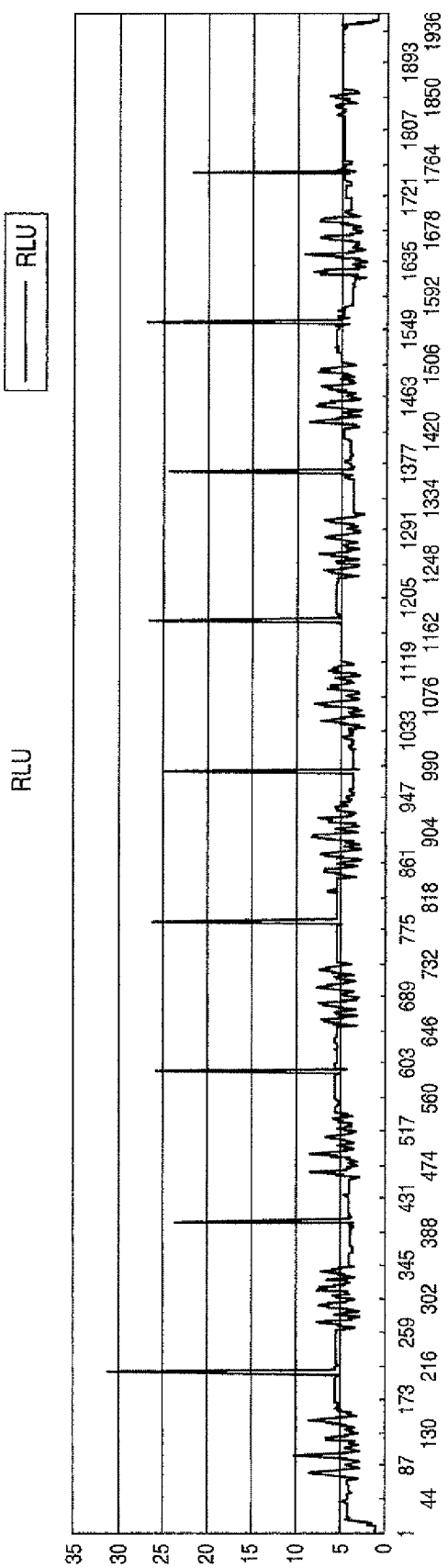

FIGS. 11A to 11D are diagrams for illustrating an example of the experimental results when experiments are conducted on a table composed of ruled lines including broken lines (a process of extracting vertical ruled lines). A table 1100 shown in FIG. 11A is a process target. FIG. 11B simply shows a histogram of black pixels. As can be seen from FIG. 11B, it is difficult to discriminate a broken line from a character using only the threshold value. A histogram shown in FIG. 11C is obtained by projecting the number of black pixels of runs having run lengths smaller than the threshold value 1V or greater than the threshold value 2V in the vertical direction (which corresponds to FIG. 6B). In the histogram, only the solid line portions stand out. A graph shown in FIG. 11D shows an example of the similarity of the runs calculated by Expression 1 (which corresponds to FIG. 7B). In the graph, only the broken line portions stand out.

Figure 12A:
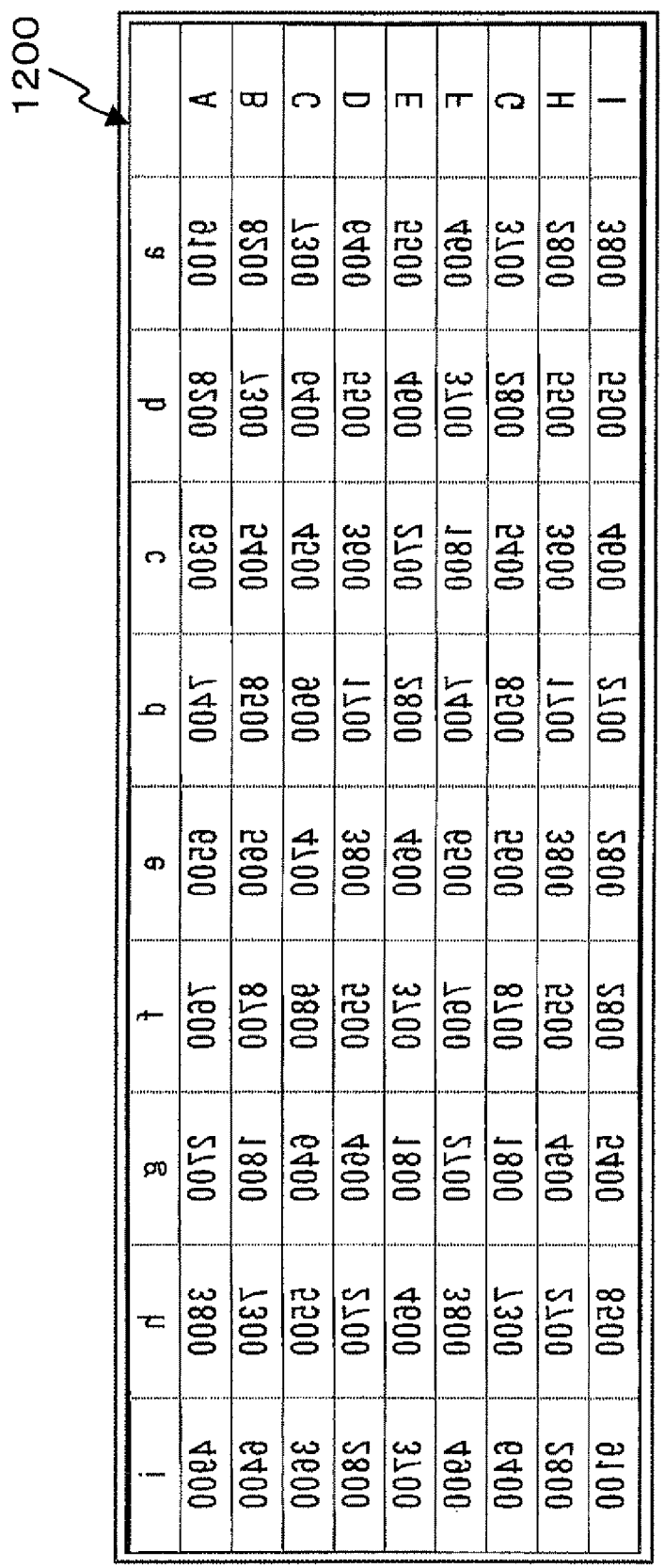
FIG. 12A, FIG. 12B, FIG. 12C and FIG. 12D are diagrams for illustrating an example of the experimental results when experiments are conducted on a table composed of ruled lines including dotted lines.
Figure 12B:
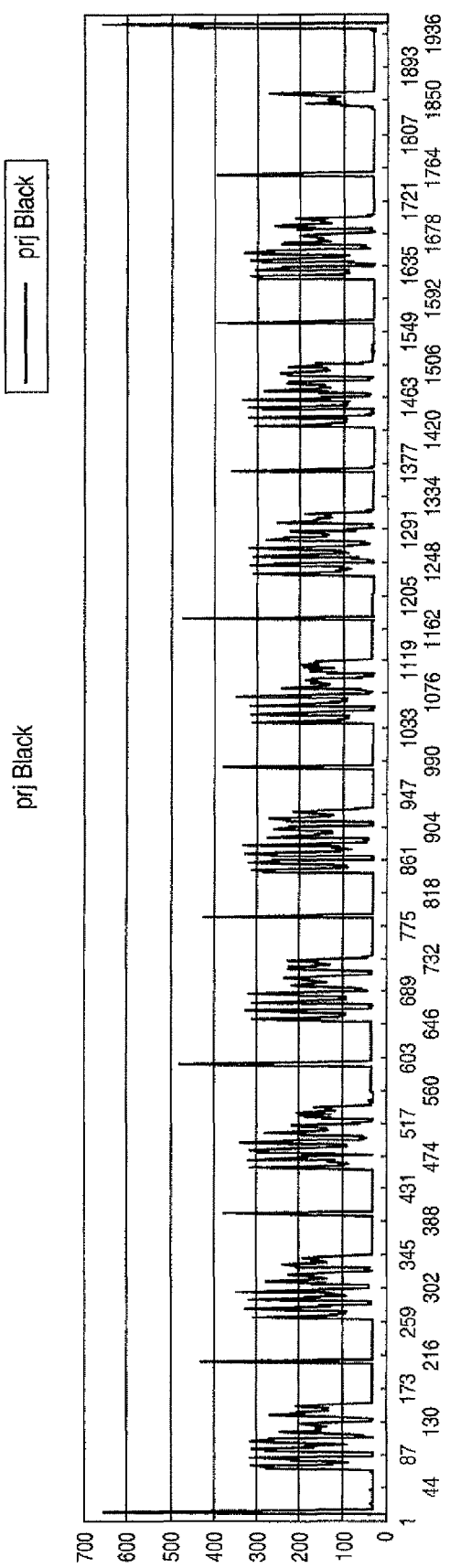
Figure 12C:
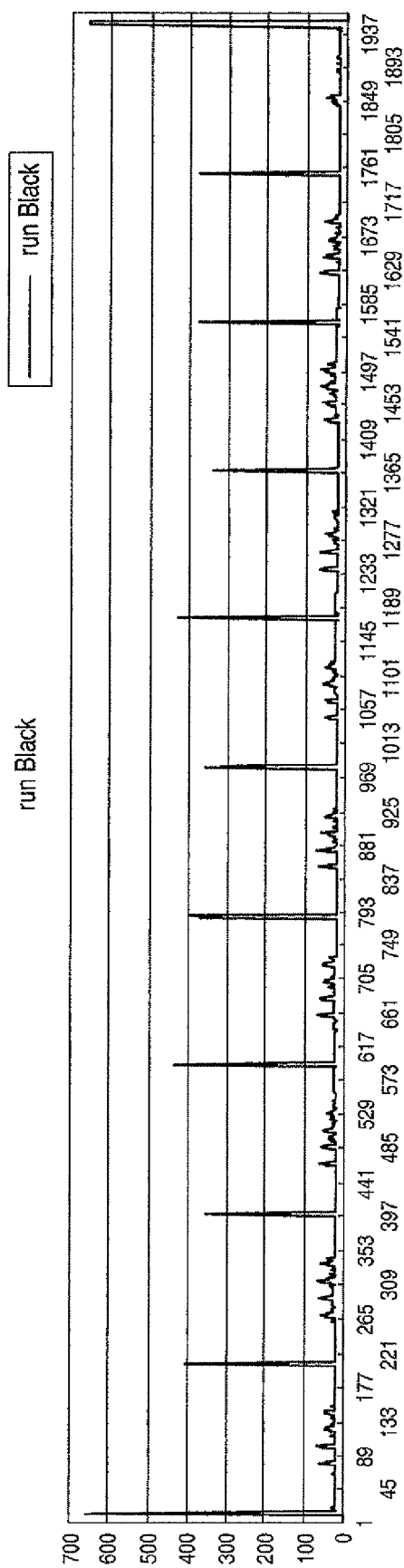
Figure 12D:
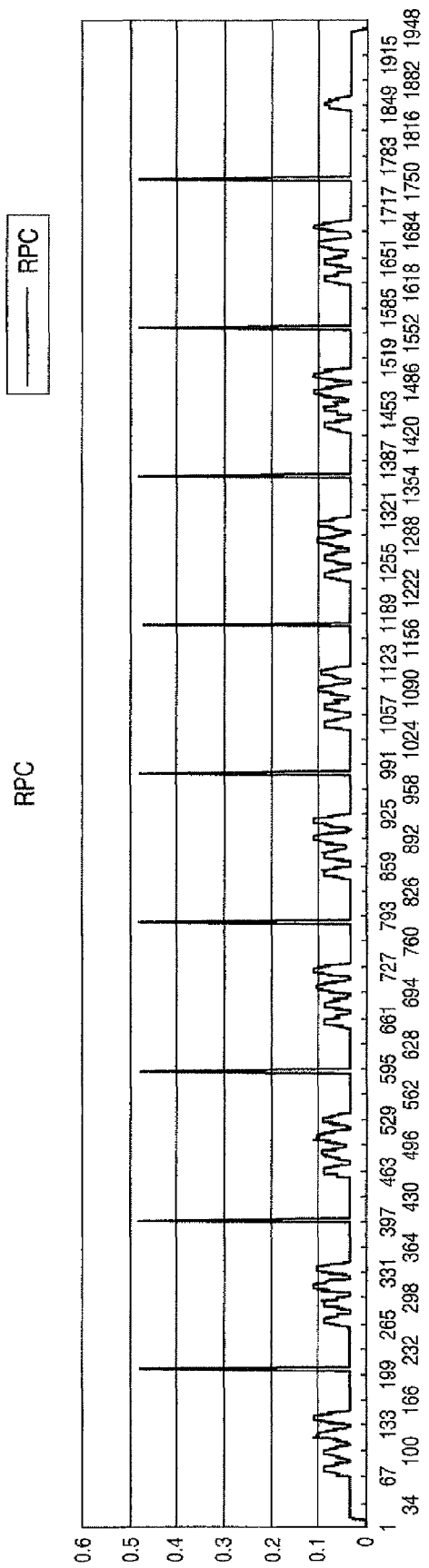

FIGS. 12A to 12D are diagrams for illustrating an example of the experimental results when experiments are conducted on a table composed of ruled lines including dotted lines (a process of extracting vertical ruled lines). A table 1200 shown in FIG. 12A is a process target. FIG. 12B simply shows a histogram of black pixels. As can be seen from FIG. 12B, it is difficult to discriminate a dotted line from a character using only the threshold value. A histogram shown in FIG. 12C is obtained by projecting the number of black pixels of runs having run lengths smaller than the threshold value 1V or greater than the threshold value 2V in the vertical direction (which corresponds to FIG. 6B). In the histogram, the solid line portions and the dotted line portions stand out. A graph shown in FIG. 12D shows an example of the similarity of the runs calculated by Formula 1 (which corresponds to FIG. 7B). In the graph, only the dotted line portions stand out.

Figure 13B:
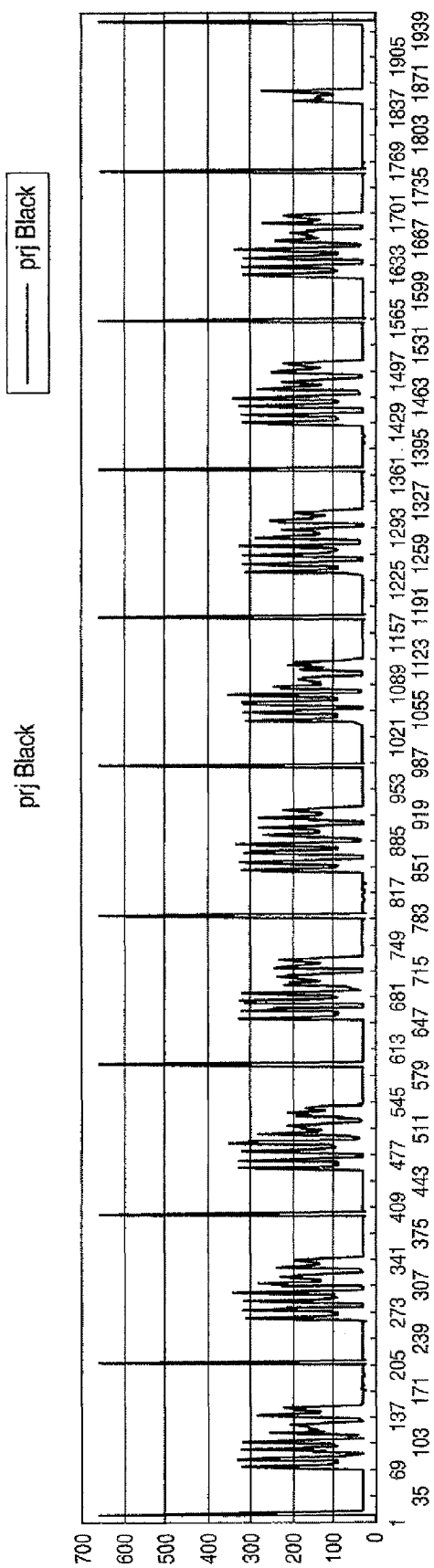
Figure 13C:
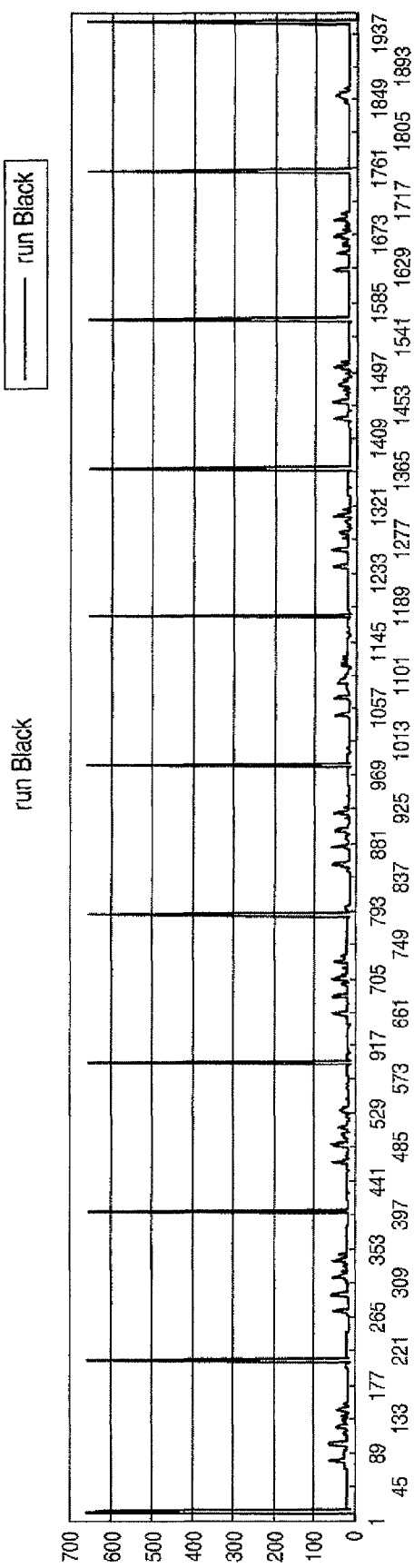
Figure 13D:
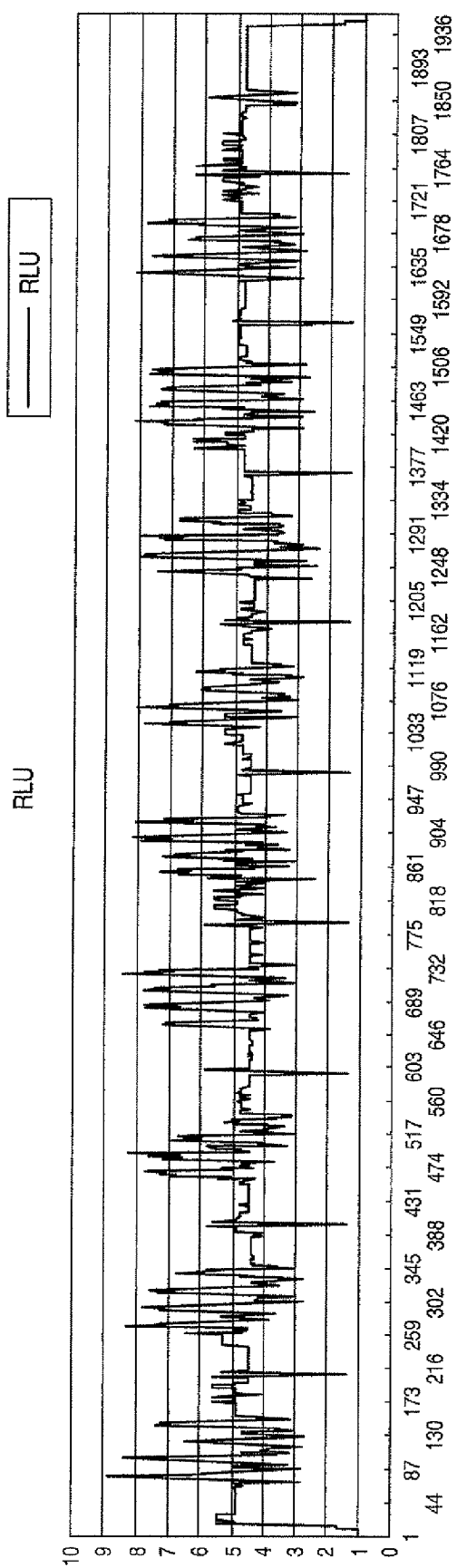

FIGS. 13A to 13D are diagrams for illustrating an example of the experimental results when experiments are conducted on a table composed of sold ruled lines (a process of extracting vertical ruled lines). A table 1300 shown in FIG. 13A is a process target. FIG. 13B simply shows a histogram of black pixels. A histogram shown in FIG. 13C is obtained by projecting the number of black pixels of runs having run lengths smaller than the threshold value 1V or greater than the threshold value 2V in the vertical direction (which corresponds to FIG. 6B). In the histogram, only the solid line portions stand out. A graph shown in FIG. 13D shows an example of the similarity of the runs calculated by Formula 1 (which corresponds to FIG. 7B). As can be seen from the graph, no portion stands out. The range shown in FIG. 13D is different from that shown in FIG. 11D, and FIG. 13D shows range expansion.

Figure 14:
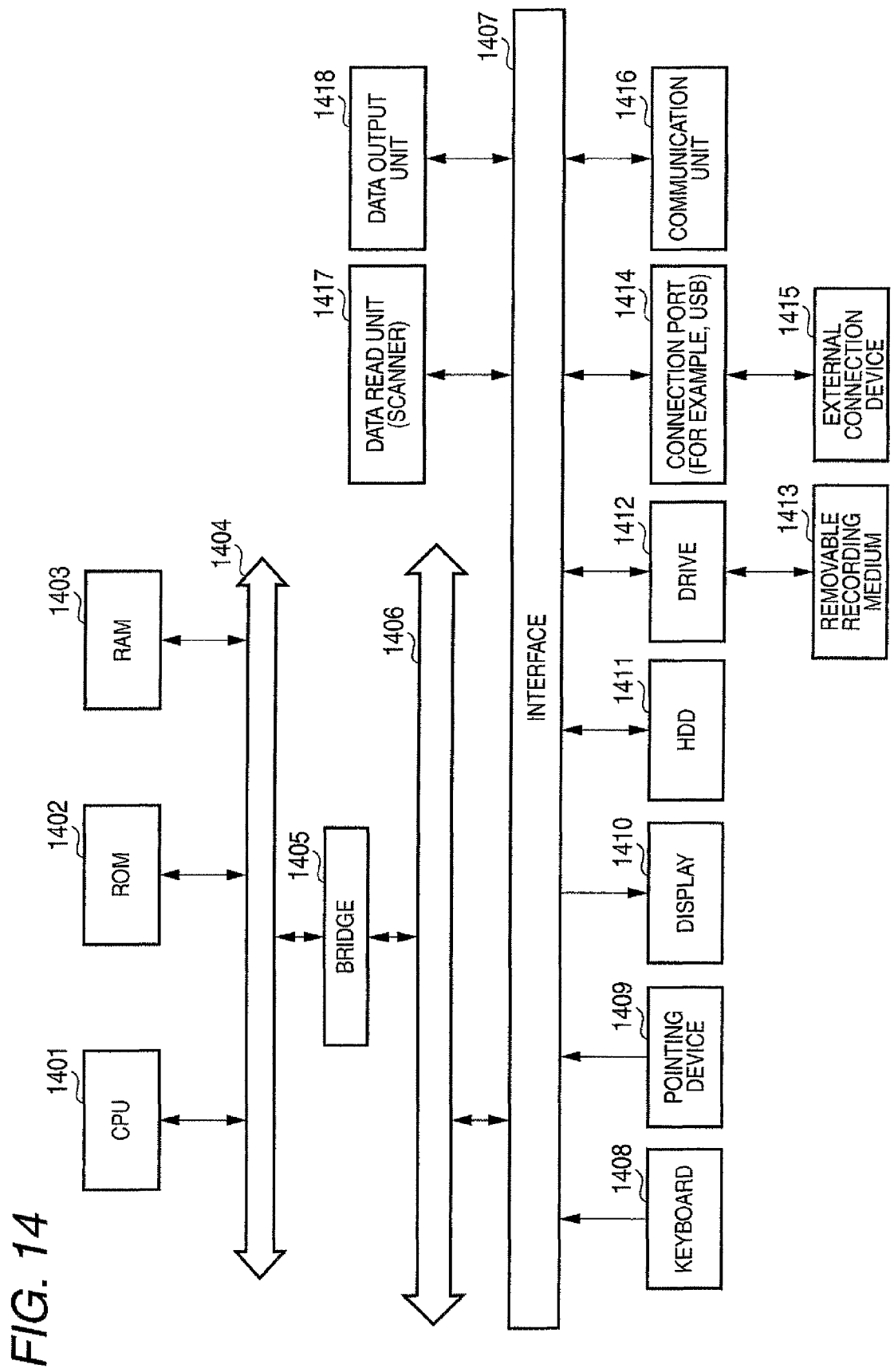
FIG. 14 is a block diagram illustrating an example of the hardware structure of a computer that implements this embodiment.

Next, an example of the hardware structure of the image processing apparatus according to this embodiment will be described with reference to FIG. 14. The hardware structure shown in FIG. 14 is composed of, for example, a personal computer (PC), and includes a data read unit 1417, such as a scanner, and a data output unit 1418, such as a printer.

A CPU (central processing unit) 1401 is a control unit that performs processes according to a computer program having described therein a sequence for executing various modules according to the above-described embodiment, that is, the run length counting module 110, the run evaluating module 120, the ruled line determining module 130, the ruled line image generating module 140, the ruled line image correcting module 150, the object separation module 220, and the table region extracting module 230.

A ROM (read only memory) 1402 stores programs used by the CPU 1401 or operation parameters. A RAM (random access memory) 1403 stores, for example, programs used in the execution of the CPU 1401 or parameters that are appropriately changed in the execution. They are connected to each other by a host bus 1404 such as a CPU bus.

The host bus 1404 is connected to an external bus 1406, such as a PCI (peripheral component interconnect/interface), through a bridge 1405.

A keyboard 1408 and a pointing device 1409, such as a mouse, are input devices operated by an operator. A display 1410 is, for example, a liquid crystal display device or a CRT (cathode ray tube), and displays various information items as text or image information.

An HDD (hard disk drive) 1411 has a hard disk provided therein, and drives the hard disk to record or reproduce the program executed by the CPU 1401 or information. The hard disk stores, for example, the image received by the image receiving module 210 and the table image corrected by the table ruled line correcting module 240. In addition, the hard disk stores various computer programs such as various data processing programs.

The drive 1412 reads data or programs recorded on a removable recording medium 1413 inserted thereinto, such as a magnetic disk, an optical disk, a magneto-optical disk, or a semiconductor memory, and supplies the read data or program to the RAM 1403 connected thereto, through an interface 1407, the external bus 1406, the bridge 1405, and the host bus 1404. The removable recording medium 1413 may be used as a data recording area, similar to the hard disk.

A connection port 1414 is for connection to an external connection device 1415 and includes connection units, such as a USB and IEEE 1394. The connection port 1414 is connected to the CPU 1401 through the interface 1407, the external bus 1406, the bridge 1405, and the host bus 1404. A communication unit 1416 is connected to a network and performs data communication with the outside. The data read unit 1417 is, for example, a scanner and performs the process of reading a document. The data output unit 1418 is, for example, a printer and performs the process of outputting document data.

The hardware configuration of the image processing apparatus shown in FIG. 14 is just an example. This embodiment is not limited to the configuration shown in FIG. 14, but it may have any configuration as long as it can execute the above-mentioned modules. For example, some modules may be implemented by a dedicated hardware component (for example, an application specific integrated circuit (ASIC)). Some modules may be provided in an external system and connected to the image processing apparatus through communication lines. A plurality of systems shown in FIG. 14 may be connected to each other through communication lines so as to operate in cooperation with each other. Some modules may be integrated into a copier, a facsimile, a scanner, a printer, or a multi-function machine (an image processing apparatus having two or more functions of a scanner, a printer, a copier, and a facsimile).

In the above-described embodiment, a dotted line and a broken line are given as examples of a cut ruled line. However, for example, a one-dot chain line or a two-dot chain line may be used as the ruled line.

The flowchart shown in FIG. 3, Step S302 is divided into Step S310 and Step S350. However, the process from Steps S310 to S326 may be performed, and the received image may be rotated 90 degrees. Then, the process from Steps 3310 to S326 may be performed again.

The above-mentioned program may be stored in a recording medium and then provided, or the program may be provided through a communication unit. In this case, for example, the above-mentioned program may be implemented as a "computer-readable recording medium having a program recorded thereon".

The "computer-readable recording medium having a program recorded thereon" means a computer-readable recording medium on which a program is recorded and which is used to install, execute, and distribute a program.

Examples of the recording medium include digital versatile disks (DVDs), such as "DVD-R, DVD-RW, and DVD-RAM" of which the standard is defined by the DVD forum and "DVD+R and DVD+RW" of which the standard is defined as DVD+RW, compact disks (CDs), such as a read only memory (CD-ROM), a CD recordable (CD-R), and a CD rewritable (CD-RW), a blue-ray disc (registered trademark), a magneto-optical disk (MO), a flexible disk (FD), a magnetic tape, a hard disk, a read only memory (ROM), an electrically erasable and programmable read only memory (EEPROM), a flash memory, and a random access memory (RAM).

The above-mentioned program or a part thereof may be recorded on the recording medium and then the recording medium may be held or distributed. The program or a part thereof may be transmitted by communication using a transmission medium, such as a wired communication network, a wireless communication network, or a combination thereof. Examples of the wired communication network include a local area network (LAN), a metropolitan area network (MAN), a wide area network (WAN), the Internet, the Intranet, and the Extranet. In addition, the program or a part thereof may be transmitted on a carrier wave.

The program may be a part of another program, or it may be recorded on a recording medium along with another program. The program may be separately recorded on a plurality of recording media. The program may be recorded by any method, such as compression or encryption, as long as it can be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a measuring unit that measures lengths of segments in an image;
   a first evaluating unit that evaluates the segments based on the lengths of the segments measured by the measuring unit, wherein the first evaluating unit extracts segments having lengths in a range set in advance in a direction of the image at each position in another direction of the image intersecting with the direction, obtains a total number of black pixels of the extracted segments arranged in the direction by counting the black pixels thereof, and employs the obtained total number of the black pixels as a first evaluation result;
   a second evaluating unit that evaluates the segments based on the lengths of the segments measured by the measuring unit, wherein the second evaluating unit calculates an indication of frequency of appearance of similar lengths of the segments arranged in the direction at each position in said another direction, in which the similar lengths are based on a run length uniformity (RLU), and employs the calculated indication as a second evaluation result; and a determining unit that determines whether each segment forms a ruled line based on the first evaluation result obtained by the first evaluating unit and the second evaluation result obtained by the second evaluating unit.

2. The image processing apparatus according to claim 1, wherein the measuring unit measures the lengths of the segments in a vertical direction of the image and the length of the segment in a horizontal direction thereof, the position of each segment indicates a position of the segment in the vertical direction of the image or a position of the segment in the horizontal direction thereof, and the determining unit determines whether each segment is a ruled line in the vertical direction or not, and whether each segment is a ruled line in the horizontal direction or not.

3. The image processing apparatus according to claim 2, further comprising:

a table image generating unit that generates a table image using each segment determined to be the ruled line by the determining unit; and a solid line converting unit that converts each ruled line of the table image generated by the table image generating unit into a solid line.

4. The image processing apparatus according to claim 1, further comprising:

a table image generating unit that generates a table image using each segment determined to be the ruled line by the determining unit; and a solid line converting unit that converts each ruled line of the table image generated by the table image generating unit into a solid line.

5. The image processing apparatus according to claim 1, wherein the RLU is calculated using the following formula:

$$RLU(\theta) = \frac{\Sigma_a (\Sigma_R M(a, R; \theta))^2}{\Sigma_a \Sigma_R M(a, R; \theta)}$$

where a indicates a pixel density, R indicates a run length, θ indicates a scanning direction, and M(x) indicates a frequency of appearance.

6. The image processing apparatus according to claim 1, wherein the range used in the first evaluation unit includes a case that the length of the segment is less than a first threshold and a case that the length of the segment is more than a second threshold which is larger than the first threshold, and excludes a case that the length of the segment is more than the first threshold and less than the second threshold.

7. The image processing apparatus according to claim 1, wherein in the first evaluation result, the determining unit determines the segment forms the ruled line when the obtained total number of the black pixels is more than a third threshold, and in the second evaluation result, the determining unit determines the segment forms the ruled line when the indication is more than a fourth threshold.

8. The image processing apparatus according to claim 1, wherein the segment indicates a line segment.

9. An image processing method comprising:
measuring lengths of segments in an image;
evaluating each segment based on the measured length of the segment;

extracting segments having lengths in a range set in advance in a direction of the image at each position in another direction of the image intersecting with the direction, obtaining a total number of black pixels of the extracted segments arranged in the direction by counting the black pixels thereof and employing the obtained total number of the black pixels as a first evaluation result;

evaluating each segment by calculating, for each segment, an indication of a frequency of appearance of segments having lengths in a predetermined range of the segment at each position of the segment;

calculating an indication of frequency of appearance of similar lengths of the segments arranged in the direction at each position in said another direction, in which the similar lengths are based on a run length uniformity (RLU), and employing the calculated indication as a second evaluation result; and determining, by a processor, whether each segment forms a ruled line based on the first and second evaluation results.

10. The image processing method according to claim 9, wherein the measuring includes measuring in a vertical direction of the image and the length of the segment in a horizontal direction thereof, the position of each segment indicates a position of the segment in the vertical direction of the image or a position of the segment in the horizontal direction thereof, and the determining includes determining as to whether each segment is a ruled line in the vertical direction or not, and whether each segment is a ruled line in the horizontal direction or not.

11. The image processing method according to claim 9, further comprising:

generating a table image using each segment determined to be the ruled line; and converting each ruled line of a converted table image into a solid line.

12. The image processing method according to claim 9:
wherein the RLU is calculated using the following formula:

$$RLU(\theta) = \frac{\Sigma_a (\Sigma_R M(a, R; \theta))^2}{\Sigma_a \Sigma_R M(a, R; \theta)}$$

where a indicates a pixel density, R indicates a run length, θ indicates a scanning direction, and M(x) indicates a frequency of appearance.

13. A computer readable medium storing a program causing a computer to execute a process for extracting ruled lines, the process comprising:

measuring lengths of segments in an image;
evaluating each segment based on the measured length of the segment;

extracting segments having lengths in a range set in advance in a direction of the image at each position in another direction of the image intersecting with the direction, obtaining a total number of black pixels of the extracted segments arranged in the direction by counting the black pixels thereof, and employing the obtained total number of the black pixels as a first evaluation result;

evaluating each segment by calculating, for each segment, an indication of a frequency of appearance of segments having lengths in a predetermined range of the segment at each position of the segment;

calculating an indication of frequency of appearance of similar lengths of the segments arranged in the direction at each position in said another direction, in which the similar lengths are based on a run length uniformity (RLU), and employing the calculated indication as a second evaluation result; and determining whether each segment is a ruled line based on the first and second evaluation results.

14. The computer readable medium of claim 13, wherein the RLU is calculated using the following formula:

$$RLU(\theta) = \frac{\Sigma_a (\Sigma_R M(a, R; \theta)^2}{\Sigma_a \Sigma_R M(a, R; \theta)}$$

where a indicates a pixel density, R indicates a run length, θ indicates a scanning direction, and M(x) indicates a frequency of appearance.

* * * * *